(12) United States Patent
Sweeney et al.

(10) Patent No.: US 8,770,892 B2
(45) Date of Patent: Jul. 8, 2014

(54) SUBSEA RECOVERY OF SWABBING CHEMICALS

(75) Inventors: Alan J. Sweeney, Houston, TX (US); Peter Dixon, Edinburgh (GB)

(73) Assignee: Weatherford/Lamb, Inc., Houston, TX (US)

( * ) Notice: Subject to any disclaimer, the term of this patent is extended or adjusted under 35 U.S.C. 154(b) by 186 days.

(21) Appl. No.: 12/912,841

(22) Filed: Oct. 27, 2010

(65) Prior Publication Data

US 2012/0107051 A1    May 3, 2012

(51) Int. Cl.
   *F16L 1/00*    (2006.01)
   *B08B 9/02*    (2006.01)
   *F16L 1/26*    (2006.01)

(52) U.S. Cl.
   CPC ........................... *F16L 1/26* (2013.01)
   USPC ....................................... 405/184.1

(58) Field of Classification Search
   USPC .............. 405/154.1, 158, 184.1; 15/3.5, 3.51, 15/3.52, 104.091, 104.062; 166/344, 352, 166/357
   See application file for complete search history.

(56) References Cited

U.S. PATENT DOCUMENTS

| | | |
|---|---|---|
| 3,520,358 A | 7/1970 | Brooks |
| 3,640,299 A | 2/1972 | Nelson |
| 3,708,990 A | 1/1973 | Crooke |
| 3,777,499 A | 12/1973 | Matthew et al. |
| 3,788,084 A | 1/1974 | Matthews, Jr. |
| 3,961,493 A | 6/1976 | Nolan et al. |
| 4,155,669 A | 5/1979 | Rochelle |
| 4,229,121 A | 10/1980 | Brown |
| 4,234,268 A | 11/1980 | Scodino |
| 4,332,277 A | 6/1982 | Adkins et al. |
| 4,344,319 A | 8/1982 | Hancock et al. |
| 4,445,804 A | 5/1984 | Abdallah et al. |
| 4,463,597 A | 8/1984 | Pierce et al. |
| 4,906,136 A | 3/1990 | Norbom et al. |
| 5,044,827 A | 9/1991 | Gray et al. |
| 5,192,167 A | 3/1993 | da Silva et al. |

(Continued)

FOREIGN PATENT DOCUMENTS

| | | |
|---|---|---|
| EP | 0715114 | 6/1995 |
| GB | 2195739 | 4/1988 |

(Continued)

OTHER PUBLICATIONS

"Macaroni Deepwater Development Project: Precommissioning Manifold Header Pipework and Flowline Jumpers," Shell Deepwater Development Systems, Inc., Jun. 2, 1999, Revision 5, 16 pages.

(Continued)

*Primary Examiner* — Tara M. Pinnock
*Assistant Examiner* — Patrick Lambe
(74) *Attorney, Agent, or Firm* — Wong, Cabello, Lutsch, Rutherford & Brucculeri, LLP

(57) ABSTRACT

Apparatus and methods are described for subsea pipeline servicing, including dewatering and chemical containment. A subsea pipeline service skid has a containment bladder affixed to the skid and in fluid communication with a skid mounted pump dimensioned to pump fluid from the subsea pipeline. A sensor system at the suction side of the pump detects the presence of seawater, water, chemical agent, or gas so the pump can be operated accordingly. The chemical agent used during dewatering operations of the pipeline is selectively pumped to the containment bladder subsea so the subsea vehicle can independently take the chemical agent to the surface.

30 Claims, 8 Drawing Sheets

(56) References Cited

U.S. PATENT DOCUMENTS

| | | | |
|---|---|---|---|
| 5,267,616 | A | 12/1993 | Silva et al. |
| 5,273,376 | A | 12/1993 | Ritter, Jr. |
| 5,348,451 | A | 9/1994 | Mohn |
| 5,421,674 | A | 6/1995 | Maloberti et al. |
| 5,570,437 | A * | 10/1996 | Kluth et al. ............ 385/12 |
| 5,842,816 | A | 12/1998 | Cunningham |
| 5,883,303 | A | 3/1999 | Bliss et al. |
| 5,927,901 | A | 7/1999 | Graves |
| 5,975,803 | A | 11/1999 | Mackinnon |
| 6,022,421 | A | 2/2000 | Bath et al. |
| 6,109,829 | A | 8/2000 | Cruickshank |
| 6,145,223 | A | 11/2000 | Flesen |
| 6,170,493 | B1 | 1/2001 | Sivacoe |
| 6,171,025 | B1 * | 1/2001 | Langner et al. ........ 405/154.1 |
| 6,200,068 | B1 | 3/2001 | Bath et al. |
| 6,234,717 | B1 | 5/2001 | Corbetta |
| RE37,283 | E * | 7/2001 | Kluth et al. ............ 385/12 |
| 6,290,431 | B1 | 9/2001 | Exley et al. |
| 6,336,238 | B1 | 1/2002 | Tarlton |
| 6,435,279 | B1 * | 8/2002 | Howe et al. ............ 166/336 |
| 6,454,492 | B1 * | 9/2002 | Dean et al. ............ 405/158 |
| 6,503,021 | B2 | 1/2003 | Corbetta |
| 6,539,778 | B2 | 4/2003 | Tucker et al. |
| 6,549,857 | B2 * | 4/2003 | Fierro et al. ............ 702/51 |
| 6,840,088 | B2 | 1/2005 | Tucker et al. |
| 6,988,547 | B2 * | 1/2006 | Goodwin et al. ........ 166/53 |
| 7,013,978 | B2 * | 3/2006 | Appleford et al. ...... 166/357 |
| 7,281,880 | B2 | 10/2007 | Tucker et al. |
| 7,708,839 | B2 | 5/2010 | Yemington |
| 7,996,946 | B1 * | 8/2011 | Riley ............ 15/3.51 |
| 2002/0040782 | A1 | 4/2002 | Rytlewski et al. |
| 2002/0059687 | A1 | 5/2002 | Smith et al. |
| 2002/0129641 | A1 | 9/2002 | Tucker et al. |
| 2003/0010094 | A1 | 1/2003 | Tucker et al. |
| 2003/0145991 | A1 | 8/2003 | Olsen |
| 2003/0154769 | A1 * | 8/2003 | Tucker et al. ............ 73/49.1 |
| 2003/0170077 | A1 | 9/2003 | Herd et al. |
| 2004/0031623 | A1 | 2/2004 | Fontana |
| 2006/0162934 | A1 | 7/2006 | Shepler |
| 2007/0003371 | A1 * | 1/2007 | Yemington ............ 405/154.1 |
| 2009/0288836 | A1 | 11/2009 | Goodall et al. |
| 2010/0089126 | A1 | 4/2010 | Sweeney |
| 2011/0094296 | A1 * | 4/2011 | Burns et al. ............ 73/64.56 |
| 2012/0168171 | A1 * | 7/2012 | Varpe ............ 166/363 |

FOREIGN PATENT DOCUMENTS

| | | |
|---|---|---|
| GB | 2460668 A | 9/2009 |
| JP | 06226185 | 8/1994 |
| WO | 02084160 | 10/2002 |
| WO | 02088658 | 11/2002 |
| WO | 03002403 | 1/2003 |
| WO | 2006134396 | 12/2006 |
| WO | 2008/100943 A2 | 8/2008 |

OTHER PUBLICATIONS

Email from John Everard to Mike Dupre regarding the Brazil Project dated Jan. 8, 2002, 9 pages.

Graves, Les, "Deepwater Pipeline Flooding and Pigging Without Connection to a Surfacwe Vessel," Transaction-Institute of Marine Engineers, Series C, 1999; V 111, No. 1, pp. 151-160.

NACE International, "Public Affairs-White Paper," http://www.nace.org.nace/content/publicaffairs/media/pims.asp.

Battelle, "Energy & Envrionment: Determining Benefits of Hydrotesting," http://www.battelle.org/environment/hydrotesting.stm.

Hydrostatic Test, http://en.wikipedia.org/wiki/hydrostatic.sub.—test.

Syd Graves, "Vessel-free flooding of deepwater piplines using the Copipe SPU," Proceedings of the 1998 Deepwater Pipeline Technology Conference, New Orleans, USA Mar. 9-11, 1998.

Copipe, "Subsea pig works independently of DSVs," Offshore Magazine, Oil & Gas Journal vol. 58, Issue 2, Feb. 1998.

"BJ Process and Pipeline Services completes major pipeline pre-commissioning operation for DSND," Hydrocarbononline.com, Aug. 29, 2000.

Valkyrie "ROV-based solution simplifies pipeline commissioning," www.offshore-mag.com, vol. 62, Issue 3, Mar. 1, 2002.

Engineered Products Catalogue, May 2002.

Mappus, "Pipeline Hydrotesting, Dewatering and Commissioning," Offshore Technology Conference, OTC 19062, Houston, Texas Apr. 30-May 3, 2007.

"The Abandonment of Offshore Pipelines: Method and Procedures for Abandonment," prepared by John Brown Engineers and Constructors Ltd for the Health and Safety Executive; OTH 535, (c) 1997, 229 pages.

"Pipeline Drying," Michell Instruments Ltd. www.michell.co.uk, 2 pages.

"Evaluation of pipeline-drying techniques," by Andrew Barden, et al.; The Pipeline Pigging Conference, Jakarta Indonesia May 27-30, 1996, 10 pages.

"Pigging in Pipeline Pre-Commissioning," by David Russell; (c) 2005 Pigging Products and Services Association, 8 pages.

European Search Report and Opinion in counterpart EP Appl. EP 11 18 6945, dated Mar. 27, 2014.

Shen, H. et al., "Blind Faith Gas Export Pipeline Pre-Commisioning and Commisioning (PCC) Challenges," OTC Paper 21033, copyright 2010, prepared for presentation at 2010 conference May 3-6, 2010.

Falck, C. et al., "Commissioning 8000 km of subsea pipelines," The international Society o9f Offshore and Polar Engineers, copyright 2005.

\* cited by examiner

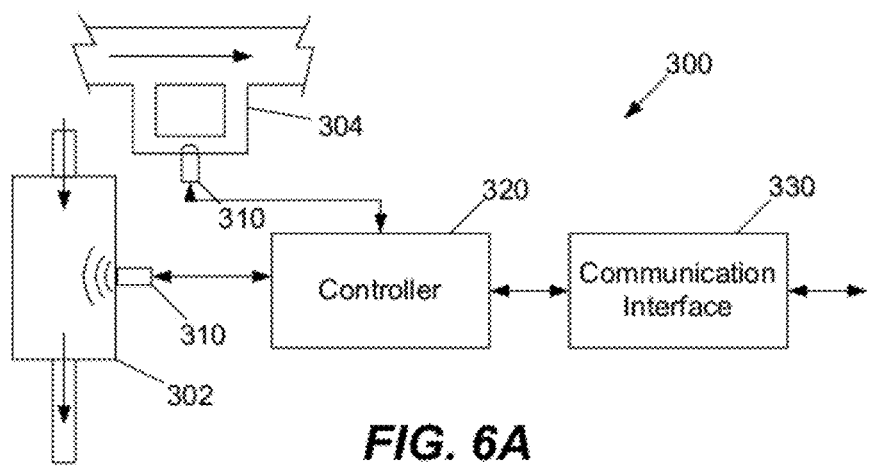
*FIG. 6A*
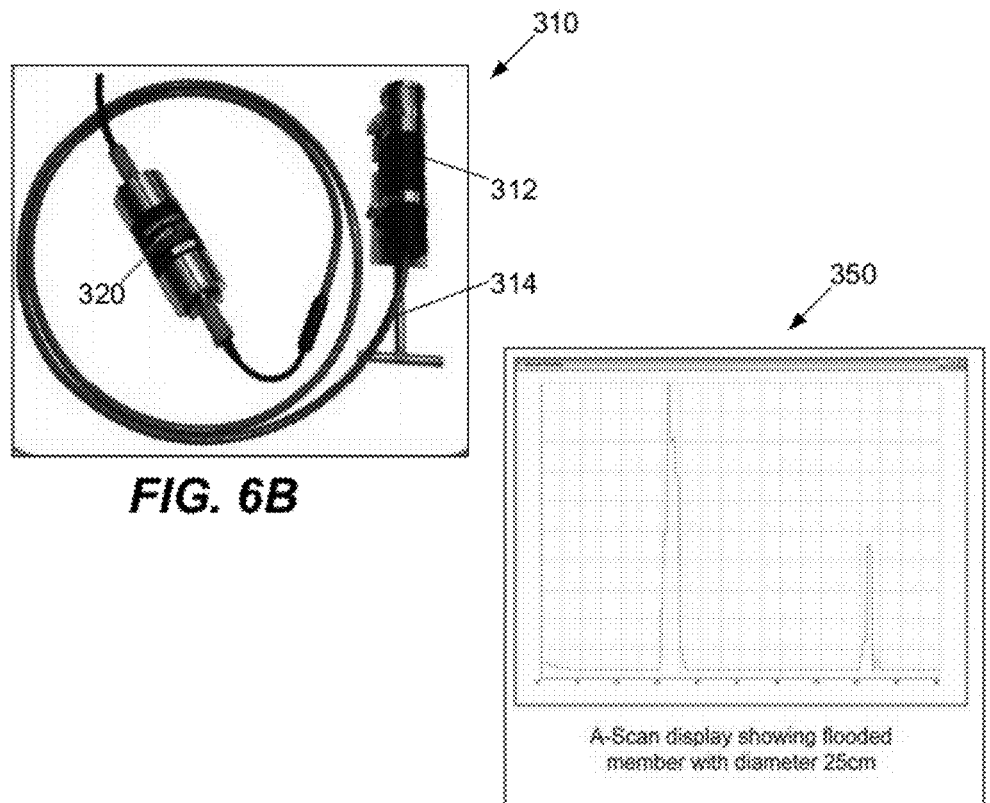
*FIG. 6B*
*FIG. 6C*

SUBSEA RECOVERY OF SWABBING CHEMICALS

BACKGROUND

Approximately 60% of the world's petroleum production derives from offshore operations. To meet demands, and in an environment of increased values for oil and gas, exploration and subsequent production is being undertaken in deeper and deeper waters. For example, oil and gas is now being produced in 5,000-10,000 feet of water. These offshore efforts have required expensive specialized solutions including establishment of extensive networks of subsea pipelines for transport of oil and gas from well heads to gathering structures, hub facilities and to onshore processing refineries.

Subsea pipeline undergo servicing throughout their lifetimes, beginning when they are first commissioned, intermittently during active service and as a consequence of temporary shut-ins, and when they are finally decommissioned. Newly constructed pipelines must undergo a series of commissioning steps to ensure that specifications have been met as well as to comply with regulatory requirements. Such requirements vary with pipeline composition and intended use.

Pipeline commissioning will generally include at least flooding, cleaning and gauging, hydrotesting, dewatering and drying before any product can be introduced into the line. The initial flooding operations typically include pushing of a pre-installed pig through the pipeline with treated seawater. The pipeline will be flooded between a pair of valved closures such as pipeline end terminations (PLETs). The pig or pigs transiting the pipeline in conjunction with flooding may participate in cleaning of the pipeline of millscale and other debris as well as assessment of dents, buckles and other out of round defects in the pipeline.

After completion of flooding, the pipeline is hydrostatically tested to federal guidelines by pressurizing the relatively non-compressible seawater filling the pipeline using high-pressure pumps. US Federal Safety Regulations set out at 49 C.F.R. Part 195, require "pipelines used to transport hazardous or highly volatile liquids" are to "be tested at a pressure equal to 125% of the maximum allowable operating pressure (MAOP)" for a set period. Gas pipeline hydrostatic testing requirements are set out in ASME B31.8 and API RP1110.

After hydrostatic testing, further cleaning may be undertaken such as for example brush pigging. Ultimately, whether seawater or potable water, the water must be removed from the pipeline. For large subsea pipelines, the volume of water that must be removed can be considerable. For one example, dewatering of the 134 miles of 20/24 dual diameter Independence Trail Gas Export Pipeline in the Gulf of Mexico required removal of thirteen million gallons of seawater.

Dewatering is typically conducted by pushing of dewatering pigs from one terminus to the other using compressed air, nitrogen, or the like. Given the immense volume to be removed, the dewatering effort may take several weeks of continuous pumping. After dewatering, the pipeline is conditioned. Water removal is required to prevent contamination of product as well as to avoid corrosion. Water removal and subsequent chemical treatment of the pipeline is particularly important to avoid hydrate formation in natural gas pipelines.

Physical removal of water is typically accomplished by sweeping water out of the line using a pig train pushed by a gas such as air or nitrogen. Salt may be flushed from the line using slugs of fresh water batched between pairs of pigs in the front of the pig train. Chemical treatment or swabbing is typically employed in natural gas pipelines to prevent hydrate formation. Chemical swabbing involves traversing slugs of hydroscopic chemicals, commonly methanol or monoethylene glycol (MEG), through the pipeline between sets of pigs that together form a pig train. For example, slugs of methanol or MEG may be placed in two or more batches in a train of four or five pigs, driven by the pressure of compressed gas. In the case of methanol swabbing, slugs of methanol may be interspersed with slugs of nitrogen to lessen risks of explosion.

Chemical treatment solutions cannot be released into the environment and heretofore have been collected through conduits running to temporary storage tanks on surface vessels. Therefore, the swabbing chemicals are collected using tubing that runs from the seafloor to a surface vessel or platform for collection. The subsea removal of chemical treatment solutions has not been heretofore possible and represents an unmet need in the industry.

What are needed are subsea pipeline service apparatus and methods able to provide for subsea collection of subsea pipeline chemicals from flowline system elements.

SUMMARY

A subsea pipeline conditioning system has at least one subsea container and a sensor. In one arrangement, the system does not require a subsea pump. Instead, flow for the conditioning system can be generated by the dewatering gas used. In this way, the discharge end of the conditioning system can remain passive with respect to pressure, and a connection can be used to selectively divert fluid communicated from the pipeline either to the environment or to the at least one subsea container. Additionally, the subsea container if at a low pressure such as 1-bar can fill subsea without the need for a subsea pump to be operated. In such an arrangement, the connection can be used between the subsea container and the pipeline with the disclosed sensor used for detection purposes. Alternatively, a subsea pump can be connected between the pipeline and the at least one subsea container, but the pump may or may not need to be operated.

In another arrangement, the conditioning system can use a subsea pump to produce flow as needed. For example, the subsea pump can include a triplex pump or other type of pump. The subsea pump can rest on the seafloor and can couple to a subsea vehicle or to a surface vessel or platform using an umbilical. Alternatively, the subsea pump can be carried by the subsea vehicle on a skid.

For its part, the subsea container, which can be an accumulator or bladder, can rest on the seafloor and can couple to the subsea pump using appropriate connections. Alternatively, the subsea container can be carried by a subsea vehicle—the same as used for the pump or a different vehicle. In one arrangement, the subsea container can be a collapsible form of bladder. However, the subsea container can be any suitable receptacle or accumulator capable of withstanding the chemicals, seawater, and subsea-to-surface pressure range under consideration.

The pump's inlet connects in fluid communication with a terminus of a pipeline having a pig receiver manifold. When operated, the subsea pump can pump fluid from its inlet to a discharge. The pump is selectively operated depending on whether seawater, potable water, chemical agent, or gas is present at the pump's inlet from the manifold. When seawater is being discharged from the manifold ahead of a train of pigs in the pipeline, for example, the seawater can be discharged to the environment. If desired, the pump can evacuate the seawater to the environment to reduce the hydrostatic head associated with the process of moving the pigs along the pipeline.

However, the sensor disposed in fluid communication between the inlet of the subsea pump and the manifold can detect one or more properties of the discharged fluid. If gas is detected at the discharge because the nitrogen or other gas used to push the pig train has bypassed the pigs, then the subsea pump stops pumping to prevent being damaged by the detected gas.

If chemical agent is detected in a slug of the pig train that should contain only seawater, potable water, or other such liquid, then the sensor detects the presence of the chemical agent so the pump can be stopped to prevent pumping the agent to the environment. When pumping of chemical agent is necessary (either due to the conditioning slug properly reaching the manifold or a bypass occurring), the conditioning system can selectively connect the at least one subsea bladder to the discharge of the subsea pump. In this way, the chemical agent in the dewatering process can be pumped to the bladder subsea and then independently transported to the surface by a subsea vehicle.

As noted above, the subsea pump can be carried by the subsea vehicle so the pump can be operated by a hydraulic motor powered by the subsea vehicle and its umbilical connection to the surface vessel or platform. The sensor can be incorporated into the subsea pump or can be an independent sensor unit manipulated by the subsea vehicle. The sensor can use any suitable form of detection, including, but not limited to, ultrasound, optical absorption, motion, and the like, to detect a property of fluid from the pipeline so fluid communication from the pipeline can be diverted to the subsea container in response to the detected property. The sensor can measure any of a number of parameters, including, but not limited, to density, mass flow, specific gravity, toxicity, viscosity, salinity, dew point, pH, and other types of measurements. In turn, the density, mass flow, or other parameter can be correlated to the type of fluid being discharged from the pipeline so the fluid can be properly diverted from the environment to the subsea container as necessary.

In one arrangement, for example, the sensor can have an ultrasonic probe disposed on a fluid member in fluid communication with the pump's suction side. The ultrasonic probe transmits an ultrasonic signal into the fluid member and detects the time of flight of any reflection of the transmitted signal. Using the time of flight and know details of the fluid member's dimensions and the expected fluids, the sensor system can determine whether the fluid member is filled with water, seawater, chemical agent, or gas. The fluid member can be a pressure vessel or flow line in fluid communication between the pig receiver manifold and the pump's inlet.

In another arrangement, the sensor can include a hydrometer for measuring the specific gravity of fluid. Additionally, the sensor can be a densitometer, such as a radioactive densitometer (RAD), a gamma or X-ray densitometer, or an ultrasonic densiometer for measuring fluid density, mass flow, or the like.

In yet another arrangement, the sensor can include a micro-motion sensor that determines momentum of fluid, from which the mass and composition of the fluid can be derived. For example, the sensor can be a liquid density transducer based on a mass spring or tuning fork principle, such as a MicroMotion Tuning Fork or the like. As the density of the measured medium changes, it in turn changes a vibrating mass of the density transducer. This vibration is then detected as a change in resonant frequency and the specific gravity. From this detected change, the density of the measured medium can be deduced.

In still other forms, the sensor can use absorption spectroscopy and can include a device such as a Red Eye® type of water cut meter or other detector available from Weatherford. The sensor can use mass spectroscopy and can include a device such as an argon plasma source magnetic sector mass spectrometers available from W.H.O.I. Marine Chemistry and Geochemistry Department. Finally, the sensor can use capacitance/conductivity measurements and can include a device such as a water cut meter or leak detector available from Phaze Technologies AS of Norway.

The foregoing summary is not intended to summarize each potential embodiment or every aspect of the present disclosure.

BRIEF DESCRIPTION OF THE DRAWINGS

FIG. 6A diagrammatically shows components of a sensor system according to the present disclosure.

FIG. 6B shows a sensor for the disclosed sensor system.

FIG. 6C shows a display of the disclosed sensor detecting a flooded member.

DETAILED DESCRIPTION

Figure 1A:
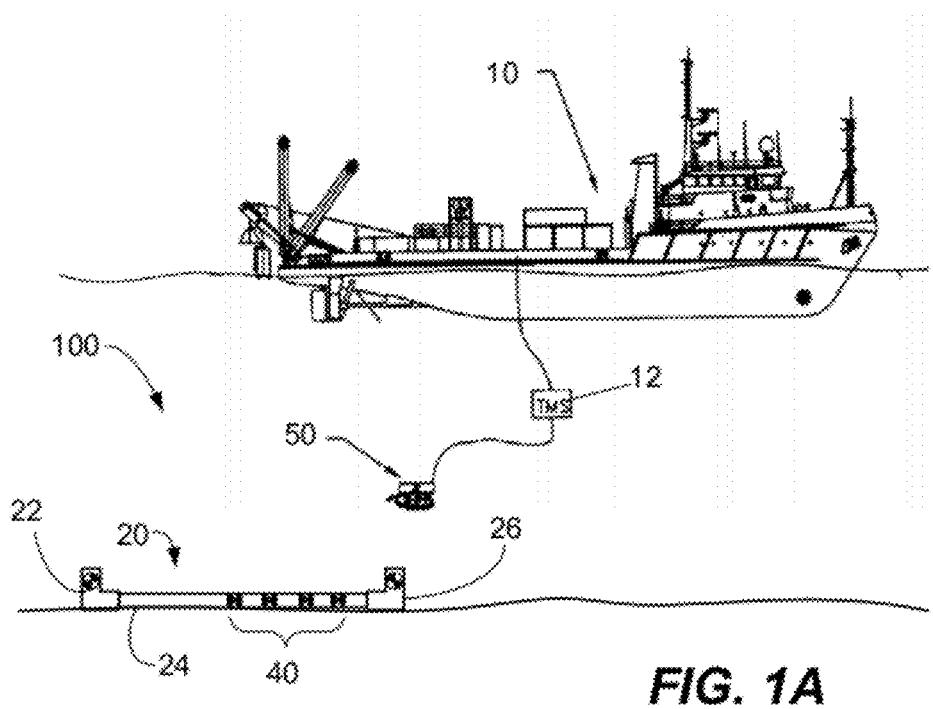
FIG. 1A shows a subsea pipeline section and a subsea vehicle deployed from a service vessel.
Figure 1B:
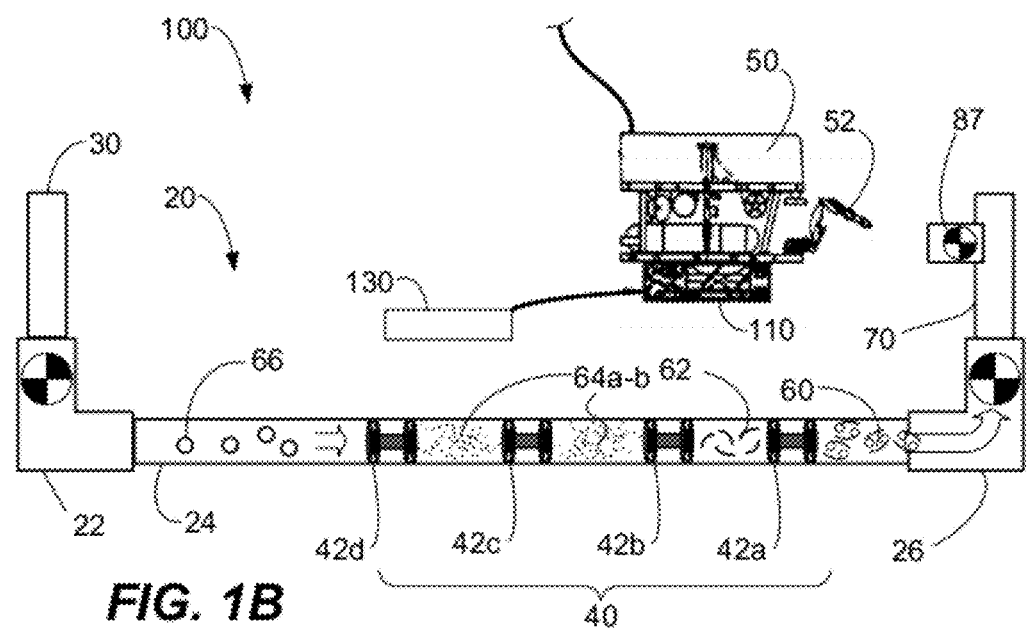
FIG. 1B shows the subsea vehicle relative to the pipeline in more detail.

Referring to FIGS. 1A-1B, a subsea pipeline 20 has a pipe section 24 disposed between two pipeline terminus 22 and 26. The pipeline terminus 22/26 can include any type of suitable valve closure for a pipeline and can include hot stab connections or laydown heads for abandonment, recovery, or initiation. The pipeline terminus 22/26 can also include subsea collection hubs having several pipeline terminations and valved closures. Such hubs can be dimensioned to connect a number of flowlines carrying oil and gas from various fields to production lines that may run, for example, to onshore facilitates.

A conditioning system 100 is used in conjunction with a support vessel 10 (as shown) or any other suitable platform. In one arrangement, the conditioning system 100 includes a pumping system 110 and a containment system 130, which are discussed in more detail later. In general, the pumping system 110 and containment system 130 can be deployed to the pipeline 20 using any available techniques and can be stored separately or together on the sea floor or an a vehicle. An umbilical (not shown) can run from the vessel 10 to the pumping system 110 to provide electrical power and any other needs.

As shown in FIGS. 1A-1B, for example, the conditioning system 100 can employ one or more subsea vehicles 50 to assist in the conditioning and dewatering of the pipeline 20. As shown in FIG. 1B, the subsea vehicle 50 can carry the pumping system 110, although the pumping system 110 could rest on the seafloor and connect to the vessel 10 via an umbilical. For its part, the containment system 130 can also be carried by the subsea vehicle 50, although again it could reset on the seafloor to be raised and lowered as needed.

In general, the subsea vehicles 50 can include any suitable vehicle, such as a Submersible Vehicle (SV) with a human operator, a tethered Remote Operated Vehicle (ROV) operated from the surface remotely, an untethered Autonomous Underwater Vehicle (AUV), or other type of subsea vehicle. The subsea vehicle 50 has a robotic arm 52 or other tools that can manipulate hoses, pumps, valves, and other equipment used when dewatering and conditioning the pipeline 20. The subsea vehicle 50 can be tethered directly to a support vessel 10 or platform at the surface and can have a tether management system (TMS) 12 for compensating changes in tether length.

To dewater and condition the pipeline 20, a pig train 40 loads into the pipeline 20 using any available technique. For example, the pig train 40 can be launched from the vessel 10 or the like using available techniques and systems connecting to the pipeline 20. Alternatively, as shown in FIG. 1B, a pig launcher 30 attaches to the pipeline terminus 22 for launching the pig train 40. In either case, a pig receiver manifold 70, described in more detail later, attaches to the other pipeline terminus 26 to receive the pig train 40 according to the purposes disclosed herein.

As depicted in FIG. 1B, the pig train 40 includes a number of pigs 42a-d. Although four pigs 42a-d are shown in the present example, the pig train 40 can have any suitable number of pigs. The pigs 42a-d have been inserted in one end of the pipeline 20 using the pig launcher 30 or other available technique. One or more sources (not shown) of gas, water, dewatering chemicals, and the like attach to the pig launcher 30 to launch the pigs 42a-d with various slugs of the gas, water, and dewatering chemicals behind and between the pigs 42a-d. The gas source (not shown) can be compressed air, nitrogen, or other inert gas 66 to be applied behind the last pig 42d of the train 40. The source of this gas can be from the vessel 10, from a subsea source, or from elsewhere. Operation of the pig launcher 30 can use a subsea vehicle other than that used at the opposing pipeline terminus 26.

Figure 2B:
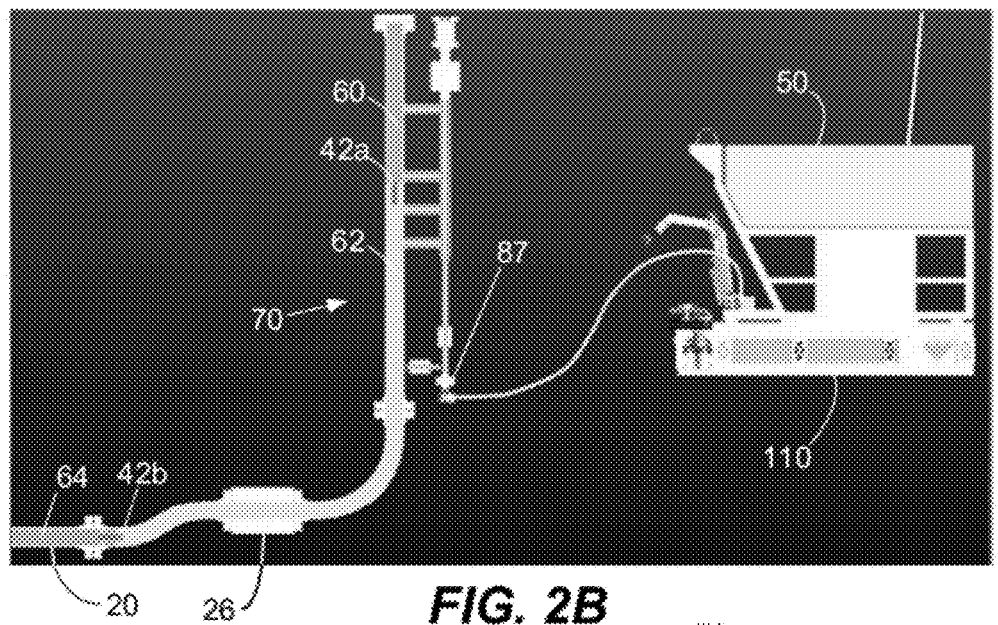
FIG. 2B shows the vehicle coupling to a pig receiver manifold of the subsea pipeline section.
Figure 2A:
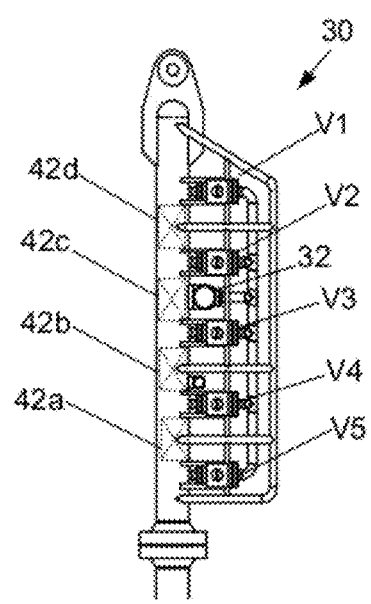
FIG. 2A shows a pig launcher for the subsea pipeline section.

Briefly, FIG. 2A shows details of a pig launcher 30 having pigs 42a-d installed relative to a plurality of valves V1-V5. Although shown as a vertical launcher, the pig launcher can be horizontal. Moreover, as noted previously, such a pig launcher 30 may not be used if another technique is used to launch the pigs 42a-d, for example, from the vessel (10; FIG. 1A) as known in the art. In any event, a hot stab 32 allows slugs of gas, water, and chemicals to be pumped into the pig launcher 30 from a suitable source (not shown). Using the valves V1-V5, the various slugs can be inserted between and behind the various pigs 42a-d using techniques known in the art so the pig train 40 can be launched into the pipeline 20 with the desired arrangement of slugs.

Various arrangements of dewatering pigs and slugs can be used. In the particular arrangement of FIG. 1B, for example, the pig train 40 includes a slug 62 of water between the first two pigs 42a-b. The water slug 62 can have any suitable additives, such as hydrotest chemicals, dye for leak detection, corrosion inhibitors, oxygen scavengers, biocides, a Tetrakis (Hydroxymethyl) Phosphonium Sulfate (THPS) additive, and the like. As an example, the water 62 can be about 755-gallons, although the amount ultimately depends on the implementation.

Slugs 64a-b of swabbing chemicals are batched between subsequent pigs 42b, 42c, & 42d. Each of these slugs 64a-b can be about 755-gallons. Finally, the source gas 66, such as compressed air or nitrogen, follows the last pig 42d and is used to push the pig train 40. In turn, the pig train 40 advances seawater 60 out of the pipeline 20 through the opposing terminus 26, which can have the pig receiver manifold 70.

With the pigs 42a-d installed in the pig launcher 30, the subsea vehicle 50 as shown in FIG. 1B moves the pumping system 110 on a skid to the pipeline terminus 26 and uses its robotic arm 52 to connect a pump of the pumping system 110 to the hot stab connection 87 at the pig receiver manifold 70. In general, the pigs 42a-d can be moved through the pipeline 20 by pushing with the gas behind the train 40, by pulling with pumping of the seawater 60, or a combination of both.

In the present implementation, the compressed gas 66 injected at the pig launcher 30 pushes the pigs 42a-d through the pipeline section 24. At the same time, the seawater 60 can be evacuated to the environment at the manifold 70. Alternatively, the pumping system 110 can pump the seawater 60 from the opposing manifold 70 to reduce the head pressure and contemporaneously pull the pigs 42a-d along the pipeline section 24. The seawater 60 ahead of the pig train 40 and potable water slug 62 can be evacuated from the pipeline 20 and can be emptied into the environment or elsewhere. However, the slugs 64a-b of swabbing chemicals between the pigs 42b, 42c, & 42d are collected according to the techniques disclosed herein.

In one arrangement, the conditioning system 100 does not require the subsea pump of the pumping system 110. Instead, flow for the conditioning system 100 can be generated by the dewatering gas used to move the pig train 40. In this way, the discharge end of the system 100 can remain passive with respect to pressure. For this arrangement, a suitable connection (e.g., a flow line jumper or the like) can be used between the containment system 30 and the manifold 70. Alternatively, the pumping system 110 can be used as a connection between the pipeline 20 and the containment system 130 without the need for the system's pump to operate. Additionally, a subsea container or bladder in the containment system 130 can be at a low pressure, such as 1-bar. In this case, the containment system 130 can fill subsea without the need for a pump in the pumping system 110 to operate.

In another arrangement, the system 100 can use the subsea pump of the pumping system 110 to produce flow as needed. The subsea pump can include a triplex pump or other type of pump. The subsea pump can rest on the seafloor and can couple to a subsea vehicle or to a surface vessel or platform using an umbilical. Alternatively, the subsea pump can be carried by the subsea vehicle on a skid.

As noted previously, swabbing chemicals of the slugs 64a-b are typically collected using tubing (e.g., coiled tubing, flexible pipe, or hose) that runs from the seafloor to the surface vessel 10 or platform. In the current implementation, however, the conditioning system 100 has the containment system 130 for this purpose. If used, the pumping system 110 connects to the hot stab connection 87 of the manifold 70 and pumps fluid from the pipeline 20. As shown in FIG. 1B and noted previously, the pumping system 110 can be incorporated into a skid carried by the subsea vehicle 50, although as noted previously the system 110 can rest on the seafloor and connect to the surface vessel 10 or platform by an umbilical.

For its part, the containment system 130 can be part of an independent frame stored subsea and retrievable to the surface using a subsea vehicle or other method. Alternatively, the containment system 130 can also be incorporated into a skid carried either by the same vehicle 50 or by some other vehicle. In any event, the pumping system 110 (or direct pipeline connection) discharges the swabbing chemicals from the manifold 70 to the containment system 130 so the swabbing chemicals from the slugs 64a-b can be recovered without using a tubing arrangement to the vessel 10 as conventionally done.

Figure 2C:
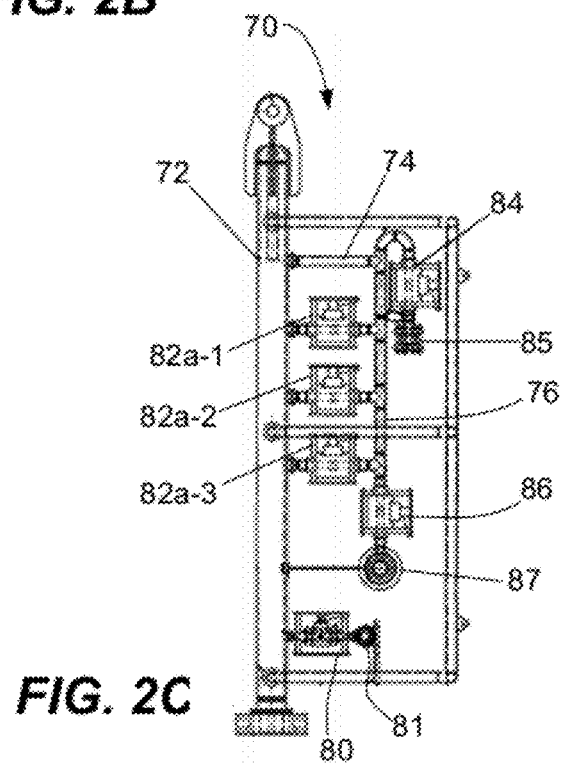
FIG. 2C shows further details of the pig receiver manifold for the subsea pipeline section.
Figure 3:
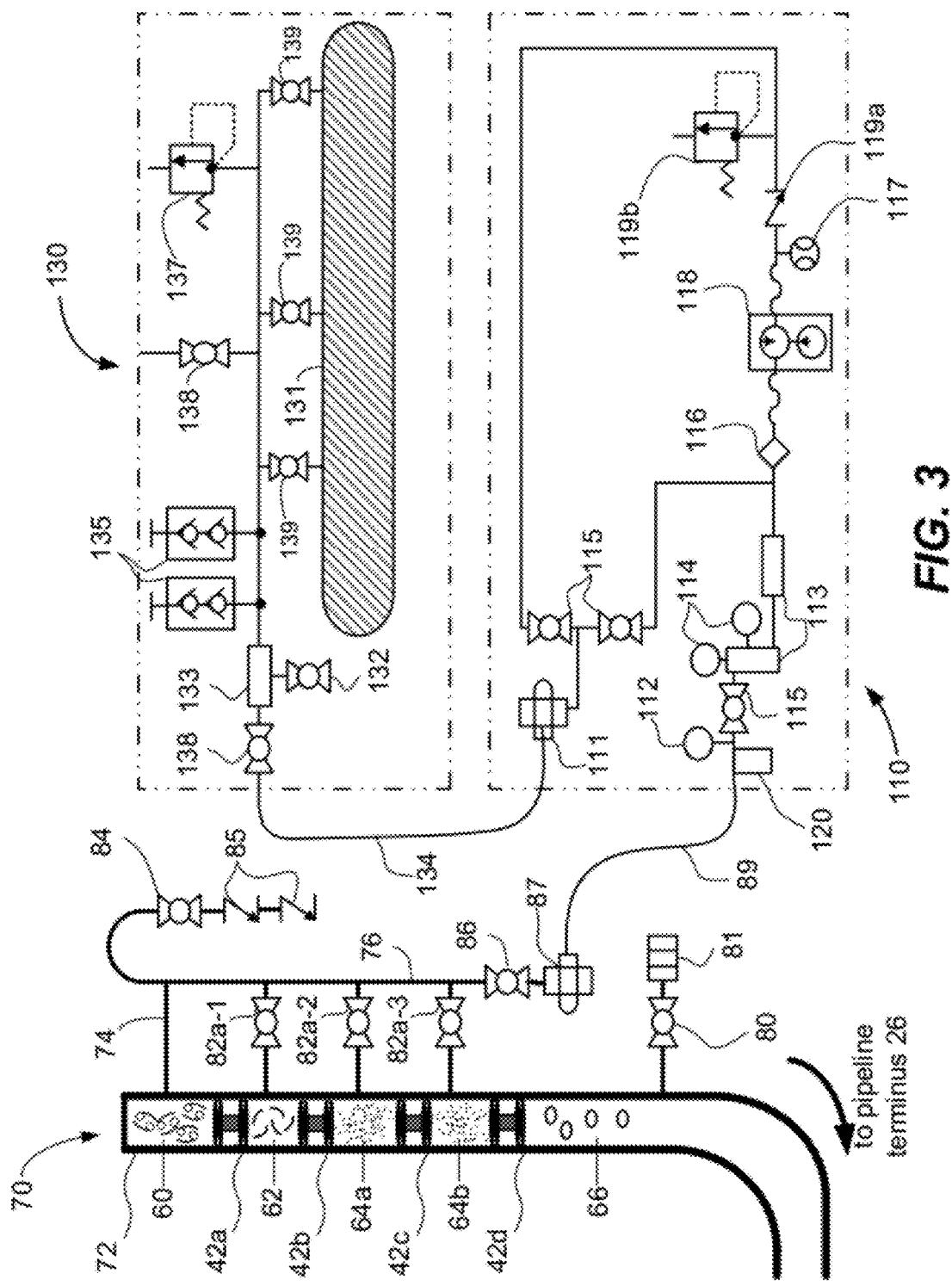
FIG. 3 shows a diagram of a pumping system and a chemical containment system relative to the pig receiver manifold.

FIG. 2B shows the subsea vehicle 50 coupling to the pig receiver manifold 70 at the terminus 26 of the pipeline 20, and FIG. 2C shows the pig receiver manifold 70 in further detail. The conditioning system 100 is depicted diagrammatically in FIG. 3. Referring to FIGS. 2B, 2C, and 3, the pig receiver manifold 70 has a pig receiver line 72 connecting to the pipeline terminus 26. This receiver line 72 is in fluid communication with a manifold line 76 via a number of valves 82a (e.g., ball valves) and a cross line 74. Another valve 80 precedes and is in fluid communication with a hot stab 81 from the pig receiver line 72, while a valve 86 precedes and is in fluid communication with another hot stab 87 from the pig receiver line 72. A final valve 84 precedes and is in fluid communication with one or more pressure relief valves 85 from the manifold line 76. The various valves 80, 82, 84, and 86 can be ROV operable ball valves so that the vehicle's robotic arm or other tool can open and close the valves as needed.

Turning now to the pumping system 110 best shown in FIG. 3, this system 110 includes an inlet sensor system 120 and a pump 118. The inlet sensor system 120, which is discussed in more detail later, couples by a jumper hose 89 to the hot stab 87 on the manifold line 76. Fluid from the hot stab 87 passes the inlet sensor system 120 and also passes a pressure sensor 112, pressure vessels 113, gas sensors 114, and a valve 115. The sensor system 120 determines what fluid is flowing through the inlet of the pumping system 110 so that pumping can be stopped and fluid redirected as needed.

Various types of sensors can be used for the inlet sensor system 120, including, but not limited to, acoustic sensors, optical sensors, and the like. For example, the acoustic sensor can use an ultrasound signal to measure time of flight through a flooded member. A micro-motion sensor can be used, as well as a hydrometer to determine specific gravity of fluid in a member. Each of the sensors is preferably packaged for subsea operation at high pressures. Further details related to the inlet sensor system 120 are provided later.

After these inlet components, fluid communication inside the pumping system 110 then branches. One branch has a dewatering filter 116 on a suction side of the pump 118 and has a dewatering flowmeter 117, a check valve 119a, and a relief valve 119b on the discharge side of the pump 118. Depending on the requirements, for example, the pump 118 may be designed to deliver pressures across the range of from 100 to 20000-psi and may pump at a typical rate of about 3 to about 38-gpm or more, although actual values depend on the implementation. The subsea vehicle 50 can power the pump 118, and the pump 118 can be a positive displacement pump, such as a triplex pump operated by a hydraulic motor.

Another branch routes off before the dewatering filter 116 and communicates with a valve 115. Here, this branch joins with the previously branched line from the discharge side of the pump 118. These two lines then communicate with a hot stab 111 for the outlet that completes the pumping system 110. Further details of the pumping system 110 can be found in U.S. application Ser No. 12/526,885, entitled "Subsea Pipeline Service Skid," which is incorporated herein by reference in its entirety.

Turning now to the containment system 130 shown in FIG. 3, this system 130 includes one or more containers or containment bladders 131. These bladders 131 can be put in fluid communication with the pumping system 110 to recover swabbing chemicals pumped from the pumping system 110. In particular, the discharge hose 134 from the pumping system's hot stab 111 can connect to an inlet valve 138 and pressure vessel 133 on the system 130 before feeding into the containment bladder 131. The bladder 131 has a number of valves 139 along the extent of the bladder 131. In this arrangement, fluid communication from the inlet line into and out of the bladder 131 can be controlled by selectively operating these valves 139. Moreover, when the bladder 131 is brought to the surface, stored chemicals in the bladder 131 may contain gas that comes out of solution near the water's surface. This gas is preferably vented through a pressure relief valve or the like incorporated into the containment system 130.

The bladder 131 can be secured within a frame structure (not shown). The bladder 131 can be formed of any material able to provide a leak proof enclosure, to withstand extremes of temperature and pressure, and to resist treatment chemicals used. In one example, the bladder 131 is formed of an elastomeric material (L4284UPW from Cooley Inc.), although other suitable materials may be used.

During the dewatering operation, one or more bladders 131 may be used to hold the swabbing chemicals pumped from the pipeline 20. The conditioning system 100 may be designed to pump all of the swabbing chemicals from the pipeline into bladders 131 available subsea. Alternatively, the system 100 may be designed to pump into one or more bladders 131 at a time, and then switch out new bladders 131 during operations to collect additional swabbing chemicals subsea.

Stab connections 135 branch off from the line connecting between the inlet valve 138 and the bladder 131. These stab connections 135 can be used to connect to a chemical sampling system (not shown), which is discussed later in FIG. 4.

Also connecting off the bladder 131, the system 130 has a relief valve 137 and an exit valve 138 for connecting to additional bladders (not shown) or other components. Further details of the containment system 130 can be found in U.S. application Ser No. 12/526,885, entitled "Subsea Pipeline Service Skid," which has been incorporated herein by reference.

Figure 4:
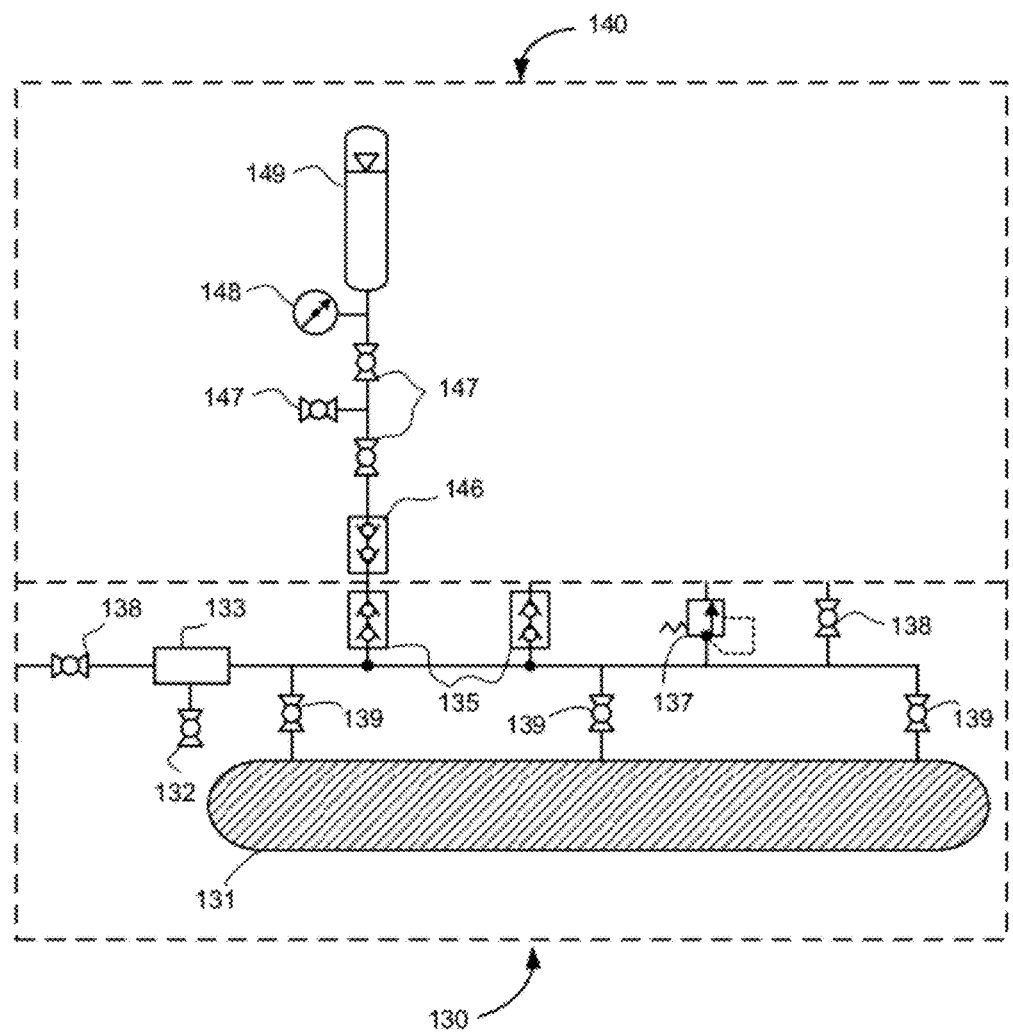
FIG. 4 shows a diagram of the chemical containment system in conjunction with a chemical sampling system.

As noted previously, the containment system 130 has stab connections 135 for connecting components of a chemical sampling system. FIG. 4 shows a chemical sampling system 140 coupled to the containment system 130. The chemical sampling system 140 includes stab connector 146 communicating along a line to a sample chamber 149. Various valves 147 dispose along the line as well as a pressure gage 148.

The sample chamber 149 is installed and deployed at ambient pressure. Then, during operations, the chamber 149 collects fluid off the containment system 130 selectively during stages of the dewatering operation. When brought to the surface with the vehicle 50, the contents of the chamber 149 can be analyzed to determine the results of the dewatering operation. Typically, when a pipeline is dewatered, the pipeline should have at least a minimum dew point. By collecting contents in a number of chambers 149 and then analyzing them, operators can determine whether the dewatering operation has reached this goal.

With an understanding of the pig receiver manifold 70, the pumping system 110, the containment system 130, and the sampling system 140, discussion now turns to general details of the dewatering operation. Overall, the conditioning system 100 operates to condition the pipeline 20 to a specific dew point, which is correlated to dryness. The pumping system 110 can connect to the manifold 70 and can draw seawater from pipeline 20 as the pig train 40 is moved along the pipeline 20, or the seawater may be discharged directly from the manifold 70 to the environment.

Seawater existing in the pipeline 20 can be readily discharged to the environment, and potable water used in the dewatering operation can also discharged to ambient. However, the swabbing chemicals (e.g., glycol) used in dewatering are captured in the containment system 130. All the while, the sensor system 120 on the suction side of the pump 118 can be used to distinguish between seawater, potable water, swabbing chemical, and nitrogen discharge from the manifold 70 when the pumping system 130 is connected. In this way, the sensor system 120 can protect the pumping system's pump 118 in the event that gas is present or bypasses between the pigs 42a-d of the pig train 40. Likewise, the sensor system 120 can detect whether mixing or bypassing of swabbing chemicals has occurred between the pigs 42a-d so the pump 118 can be stopped to prevent pumping the chemicals to the environment.

Figure 5:
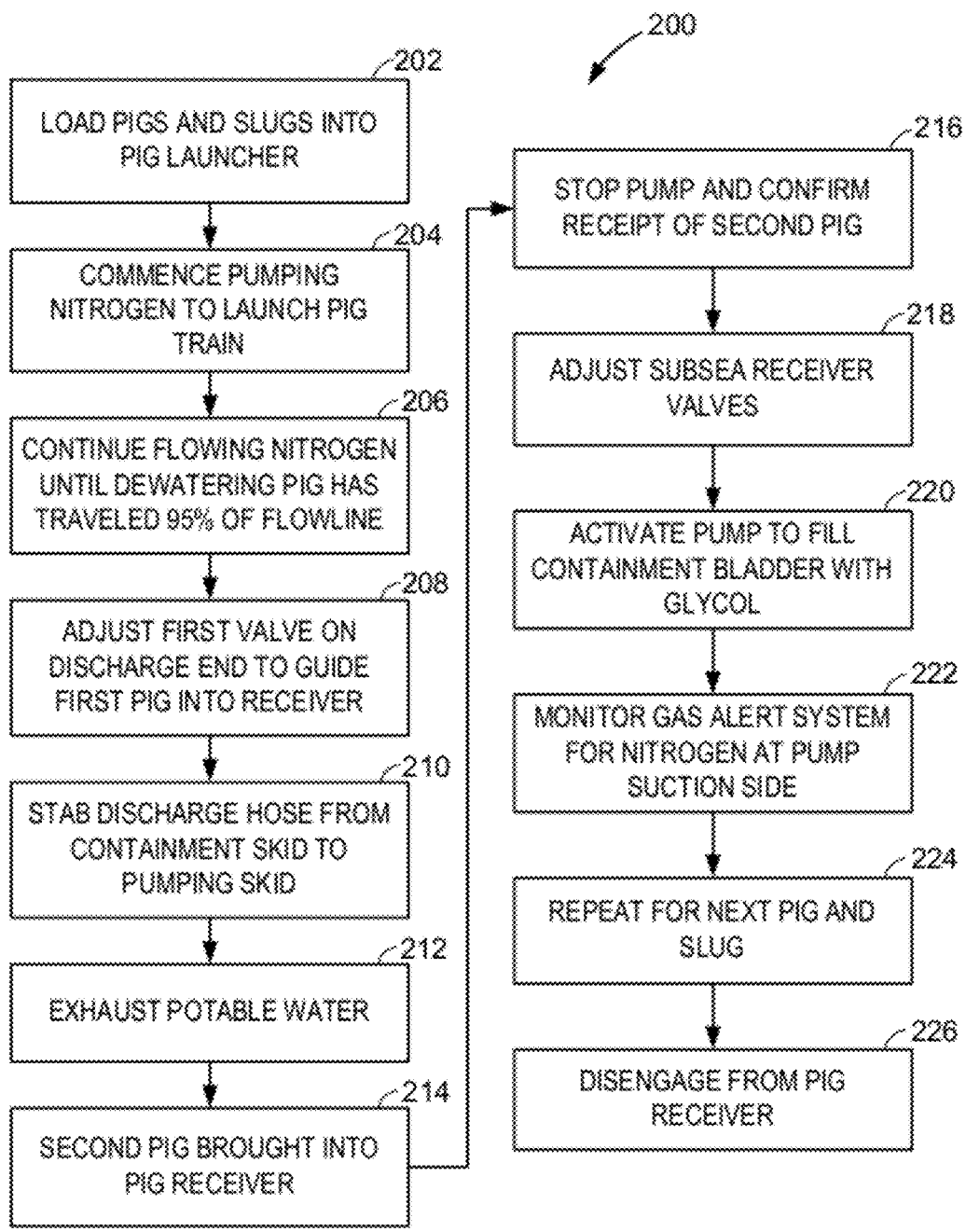
FIG. 5 is a flow chart of a conditioning process using the pumping and containment system and manifold.

Further details of the dewatering operation 200 are provided with reference to FIG. 5, which also refers to the components of the conditioning system 100 in FIGS. 1-4. As described in the operation 200 below, the pumping system 110 is operated to draw fluid to be discharged to the environment or to the containment system 130, although this is not strictly necessary. As described previously, for example, flow for the conditioning system 100 can be generated by the dewatering gas used to move the pig train 40. In this way, the discharge end of the system 100 can remain passive with respect to pressure, and the pumping system 110 (if used) does not need to draw fluid. Rather, a suitable connection can be used between the pipeline 20 and the containment system 130, or the pumping system 110 may not be operated and may act as a controllable connection.

With the pig launcher 30 and the pig receiver manifold 70 installed, operators load and launch the pigs 42a-d and slugs 60, 62, 64 from the pig launcher 30 at the far end of the pipeline 20 (Block 202). This operation uses procedures known in the art and generally involves operators using a subsea vehicle to open appropriate valves V1-V5 on the pig launcher 30 and pumping the slug 62 of potable water from a source to launch the first pig 42a. This is then repeated in series as operators launch the second pig 42b using the slug 64a of glycol and then launch the third pig 42c using the other slug 64b of glycol.

Once the pigs 42a-d are launched, operators commence pumping nitrogen to launch the pig train 40 along the pipeline 20 (Block 204). As the train 40 travels, the potable water slug 62 acts to remove salt. Subsequently, the conditioning slugs 64a-b work to dilute the remaining water film in the pipeline 20 (or condition the film to a specified dew point).

As discussed above in FIG. 1B, seawater 60 precedes the pig train 40. At this point in the operation, each of the valves 82a on the receiver manifold 70 is closed, as is the valve 80. In one arrangement, the seawater 60 can be discharged to the environment via open valve 84, and operators can monitor the inlet gas pressure's flow rate to verify correct travel of the pig train 40.

In another arrangement, the valve 84 can be closed and the valve 86 at the hot stab 87 may be open. The pump 118 on the pumping system 110 as shown in FIG. 3 can draw fluid from the manifold 70 via jumper 89. The inlet fluid passes the sensor system 120 at the inlet of the pumping system 110. Thus, the seawater 60 ahead of the pig train 40 passes from the terminus 26 and into the pig receiver line 72 and communicates via a cross line 74 to the manifold line 76 to which the hot stab 87 and pumping system 110 connect.

As long as the pump 118 draws seawater from the manifold 70, the pumping system 100 can exhaust the seawater to the surrounding environment. The system 100 exhausts the seawater via any available outlet. At some point, the swabbing chemical in the conditioning slugs 64a-b may contaminate the seawater 60 for any number of reasons. For example, the pigs 42a-d on the pig train 40 may have allowed fluid from the slugs 62, 64a-b to intermingle. If this occurs, the pump 118 may start to draw the swabbing chemicals at a stage when only seawater 60 is expected. Thus, the sensor system 120 determines the presence of the swabbing chemical. In response, pumping is stopped, and communication of fluid is diverted from the environment and redirected to the containment system 130 as described later.

If no intermingling is detected, the pig train 40 eventually reaches near the pig receiver manifold 70, and pumping of the gas 66 continues until the first pig 42a has traveled about 95% of pipeline 20 (Block 206). Various techniques available in the art can be used to determine or detect the location of the pigs 42a-d as they reach the receiver line 72. Some of these techniques include, for example, but are not limited to using acoustic pingers, magnets, active transmitters, and the like.

The operation stops pumping nitrogen gas at the pig launcher 30 and closes valve 84 so the pig train 40 stops moving along the pipeline 20. A pressure differential is maintained between the pig launcher 30 and receiver manifold 70 so that the launching side is at a higher pressure. At this point, the vehicle 50 is used to adjust the first valve 84 on discharge end of the pig receiver manifold 70 to guide the first pig 42a into the pig receiver line 72 based on the existing pressure differential (Block 208). At the surface, operators can then vent nitrogen from topside valves to depressurize the pipeline 20 to below subsea hydrostatic pressure.

If the pumping and containment systems 110 and 130 are not already connected to the manifold 70, the vehicle 50 then connects the discharge hose 134 from the pumping system 110 to the containment system 130 if not already done and configures the pumping system 110 to direct pumped fluid to the containment system 130 (Block 210).

In the following stages of operation, the pigs 42a-d dispose successively in the pig receiver line 72. Operation controls their positioning as they arrive so that they dispose relative to the valves 82a. The spacing of between each pig 42a-d while in the pipeline 20 is much longer than the pig receiver 70 so that the first pig 42a arrives well in advance of the second pig 42b. As they arrive, however, the first pig 42a is set in the receiver line 72 between the cross line 74 and first valve 82a-1, the second pig 42b is set between the first and second valves 82a-1/82a-2, the third pig 42c is set between the second and third valves 82a-2/82a-3, and the fourth pig 42d is set between the third valve 82a-3, and the valve 80 for the hot stab 81. As the pigs 42a-d arrive, the valves 82a and 86 can be selectively operated to communicate the fluid in the intervening slugs 62, 64a-b contained between the pigs 42a-d from the receiver line 72 to the manifold line 76.

Continuing with the dewatering operation 200 of FIG. 5, the first pig 42a has set into the pig receiver line 72, the seawater 60 has been discharged, and outlet valve 84 has been closed. Now, the pumping system 110 can operate to exhaust the fresh water in the slug 62 after the first pig 42a (Block 212). In particular, with the first pig 42a set in the receiver 72, the vehicle 50 operates the first valve 82a-1 and main valve 86 so that the fresh water slug 62 can be drawn through the manifold line 76 to the pumping system 110, which has each of its valves 115 open. This fresh water slug 62 can contain about 755 gallons (2.85 m³) of potable water, although the amount may depend on the type and size of pipeline being conditioned.

As long as the pump 118 draws fresh water from the manifold 70, the pumping system 110 can exhaust the fresh water to the surrounding environment via any available outlet, such as open valve 132 on the containment system 130. In general, it may not be needed to store the potable water in a containment bladder 131, but this could be done if desired.

During pumping, the swabbing chemical may contaminate the fresh water at some point for any number of reasons, and the sensor system 120 determines the presence of the chemical. If this occurs, pumping is stopped, and communication of fluid is changed from the environment to the containment bladder 131. Likewise, if the sensor system 120 detects gas in the line, then the pumping system 110 is stopped so the pump 118 is not damaged.

After the fresh water slug 62a has been discharged, the second pig 42b eventually travels into pig receiver line 72 (Block 214). Operators stop the pump 118 of the pumping system 110 and confirm receipt of the second pig 42b in the pig receiver line 72 (Block 216). Operators then use the vehicle 50 to adjust the subsea receiver valves to close valve 82a-1 and open valve 82a-2 so that the chemicals of the conditioning slug 64a can be drawn through the manifold line 76 to the pumping system 110 (Block 218). The communication between the pumping system 110 and containment system 130 is then initiated so that the pumping system 110 will not exhaust the swabbing chemicals to the environment, but instead directs the chemicals to the bladder 131. For example, the open valve 132 on the containment system 130 may be closed.

Operators activate the pump 118 to start filling the containment bladder 131 with this first conditioning slug 64a (Block 220). This conditioning slug 64a can contain about 755 gallons (2.85 m³) of glycol, although the amount may depend on the type and size of pipeline being conditioned. The pumping system 110 draws the swabbing chemical of this slug 64a from the manifold 70 and directs it to the containment system 130 and its one or more bladders 131.

During this operation, the conditioning system 100 monitors the sensor system 120 for nitrogen at the suction side of the pump 118 (Block 222). This is done to protect the pump 118 from gas reaching the pump 118. Samples of the swabbing chemical from the slug 64a can also be captured subsea using the chemical sampling system 140 as described previously. When the system 140 is returned to the surface, these samples can be tested at the surface for water content, which can be correlated to a specific dew point for the pipeline being conditioned.

The entire process is repeated for receiving the next pig 42c and pumping the second conditioning slug 64b into the containment system 130 (Block 224). Again, the conditioning slug 64b can be pumped into the bladder 131 when valve 82a-3 is open and valves 82a-1 and 82a-2 are closed. This slug 64b can also have about 755 gallons of glycol. Eventually, the final pig 42d reaches the receiver line 72, and the sensor system 120 continues to monitor for leakage of nitrogen to protect the pump 110. Once the final pig 42d reaches the receiver manifold 70, operators may equalize pressure and close off valves so the containment system 130 can be finally disengaged from the pig receiver manifold 70 and returned to the surface along with the sampling system 140 (Block 226).

As noted previously, the conditioning system 100 uses the sensor system 120 at the inlet of the pumping system 110 to detect gas in the fluid or to detect swabbing chemicals either in the seawater or potable water. Thus, the sensor system 120 can preferably distinguish between dewatering chemical, seawater, and nitrogen. As noted herein, the dewatering chemicals (e.g., glycol) is captured and contained so the sensor system 120 can help ensure that if chemicals are detected at the inlet, those chemicals are being diverted to the containment system 130.

Additionally, the sensor system 120 detects gas to protect the pump 118. As may happen, gas can bypass the final pig 42d and any of the other pigs 42a-c. The pump 118, which may be a triplex type of pump, may not be able to pump gas. Therefore, if the sensor system 120 detects gas, pumping can be stopped. Moreover, gas in the containment bladders 131 may be problematic when the bladders 131 are being recovered to the surface.

As shown in FIG. 6A, a sensor system 300 has a sensor unit 310 disposing adjacent a pressure vessel 302 that acts as a buffer for the pump inlet. Alternatively as also shown, the sensor unit 310 can dispose adjacent a flow line 304 at the pumping system's inlet. The sensor unit 310 can be an independent component mounting next to such a member (pressure vessel or flow line) or can be incorporated into the system 300. Either way, the sensor unit 310 determines properties of the fluid therein. This sensor unit 310 can be used on the suction side of the system's pump 118 and can be carried by the same vehicle 50 as the pumping system 110. Alternatively, the sensor unit 310 can be carried by a second vehicle on the suction side of the pumping system 110.

The sensor system 300 can include an appropriate controller 320 and a communication interface 330. In this way, the sensor unit 310 can communicate readings to the subsea vehicle (50) so the readings can be processed and displayed at the surface or the like.

The sensor unit 310 can use a variety of suitable forms of detection and can measure a variety of parameters according to the purposes disclosed herein. In general, the sensor unit 310 can be based on, but not limited to, ultrasound, optical absorption, motion, chemical composition, and the like. Likewise, the sensor unit 310 can measure parameters, including, but not limited to, density, mass flow, specific gravity, conductivity, toxicity, viscosity, salinity, dew point, pH, and other types of measurements. As will be appreciated, the sensor unit 310 can be based on these and other forms of detection and parameters for the purposes disclosed herein. Either way, the density, mass flow, or other parameter can be correlated to the type of fluid being discharged from the pipeline so the fluid can be properly diverted from the environment to the subsea container as necessary.

In one arrangement, for example, the sensor unit 310 can include a hydrometer for measuring the specific gravity of fluid. Alternatively, the sensor unit 310 can be a densitometer, such as a radioactive densitometer (RAD), a gamma or X-ray densitometer, or an ultrasonic densiometer for measuring fluid density, mass flow, or the like.

In another arrangement, for example, the sensor unit 310 can include a micro-motion sensor that determines momentum of fluid, from which the mass and composition of the fluid can be derived. For example, the sensor unit 310 can be a liquid density transducer based on a mass spring or tuning fork principle, such as a MicroMotion Tuning Fork or the like. As the density of the measured medium changes, it in turn changes a vibrating mass of the density transducer. This changing is then detected as a change in resonant frequency and the specific gravity. From this, the density of the measured medium can be deduced.

In still other forms, the sensor unit 310 can use absorption spectroscopy and can include a device such as a Red Eye® type of water cut meter or other detector available from Weatherford. The sensor unit 310 can use mass spectroscopy and can include a device such as an argon plasma source magnetic sector mass spectrometer available from W.H.O.I. Marine Chemistry and Geochemistry Department. Finally, the sensor unit 310 can use capacitance/conductivity measurements and can include a device such as a water cut meter or leak detector available from Phaze Technologies AS of Norway.

In one particular arrangement, the sensor unit 310 is an ultrasound sensor and can be a Flooded Member Detector, which is typically used to determine whether a leak has occurred in a subsea structure. The time of flight measurement for an acoustic pulse from the ultrasound sensor 310 can then determine whether the member (302 or 304) is filled with seawater, glycol, or nitrogen.

As shown in FIG. 6A, the sensor unit 310 disposes adjacent the member, such as vessel 302 or flowline 304, and emits an acoustic signal through the member's wall and into the member 302/304. The acoustic signal is typically a high frequency ultrasonic pulse from the sensor unit 310. If the member is empty or only partially full of liquid, then the acoustic signal will not reflect from the other side of the member back to the sensor unit 310. If the member is flooded (i.e., without gas), the sensor unit 310 will detect a reflected pulse. The second sensed amplitude from such a reflected signal is shown in the pulse response 350 of FIG. 6C.

FIG. 6B shows a flooded membrane sensor unit 310 that can determine fluid properties in a member. As shown, the sensor unit 310 includes a subsea probe 312. If used by a separate vehicle (50) to determine contents of the receiver manifold 70 or pipeline 22 in advance of the pumping system 110, the unit 310 can have an ROV T-Bar 314 for handling. Otherwise, the unit 310 can be integrated directly into the pumping system 110 and skid carried by the vehicle (50) and can be mounted relative to a pressure vessel or flowline of the pumping system 110.

The sensor unit 310 can be similar to the SeaPRO3000 (ROV flooded member detector) available from Seatronics. A subsea electronics pod 320 connects to the probe 312 and connects by appropriate connectors and interfaces to other components of the disclosed conditioning system 100. Such a sensor unit 310 may have an operating frequency of 1 MHz, an operating range (diameter) of 100 mm to 10,000 mm, and a depth rating of 3,000 m.

Although this type of sensor system 300 determines whether a member is flooded or not, the sensor system 300 determines the contents of the fluid at the inlet of the pumping system 100 using differences in times of flight through the fluid in the inlet of the pumping system 110. In this principle, the ultrasound signal emitted by the sensor unit 310 passes into the wall of the inlet line or pressure vessel 302/304. If the member 302/304 is flooded with pumped liquid, the sensor unit 310 would expect to detect a reflection of its input signal returning from the other side of the member 302/304. The time that this takes between the sending and receiving of the signal depends on the liquid in the member 302/304. Using this time of flight measurement, the sensor system 300 can detect if the liquid at the inlet is seawater, flesh water, gas, or conditioning chemical. At least, the sensor system 300 can determine if the chemical composition of what is in the inlet has changed from one point to another based on different time of flight measurements.

Figure 7A:
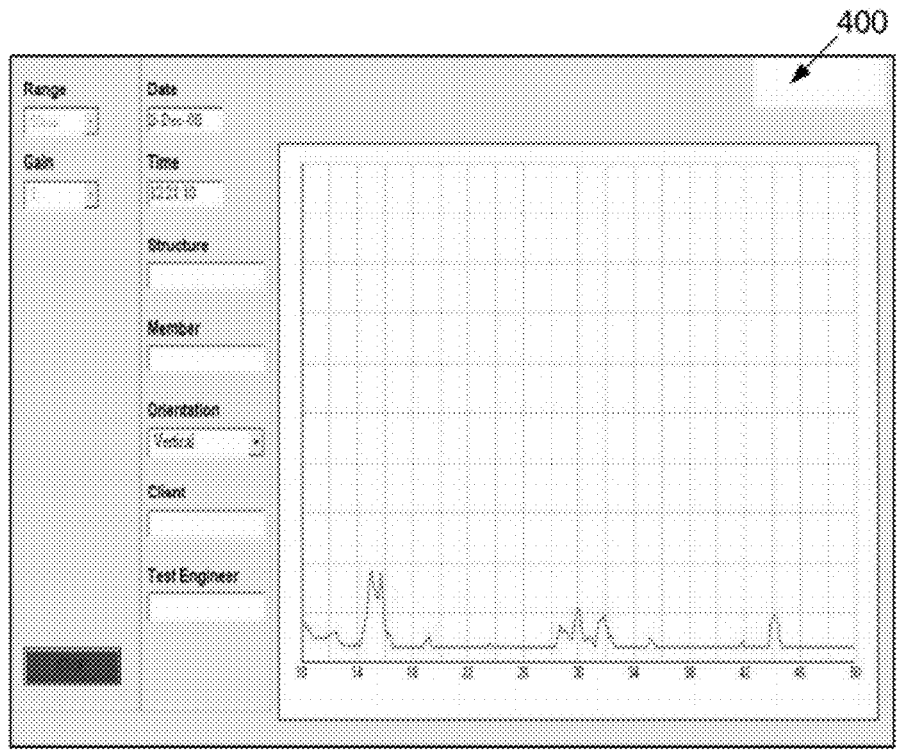
FIG. 7A shows a display of the disclosed sensor detecting seawater in a flooded member.

FIG. 7A shows a time of flight measurement 400 for a flooded member filled with seawater. The speed of sound through seawater is about 1530 m/s. The reading obtained with the sensor system 300 for the member flooded with seawater is then used as a baseline calibration for the flooded member of known diameter.

Figure 7B:
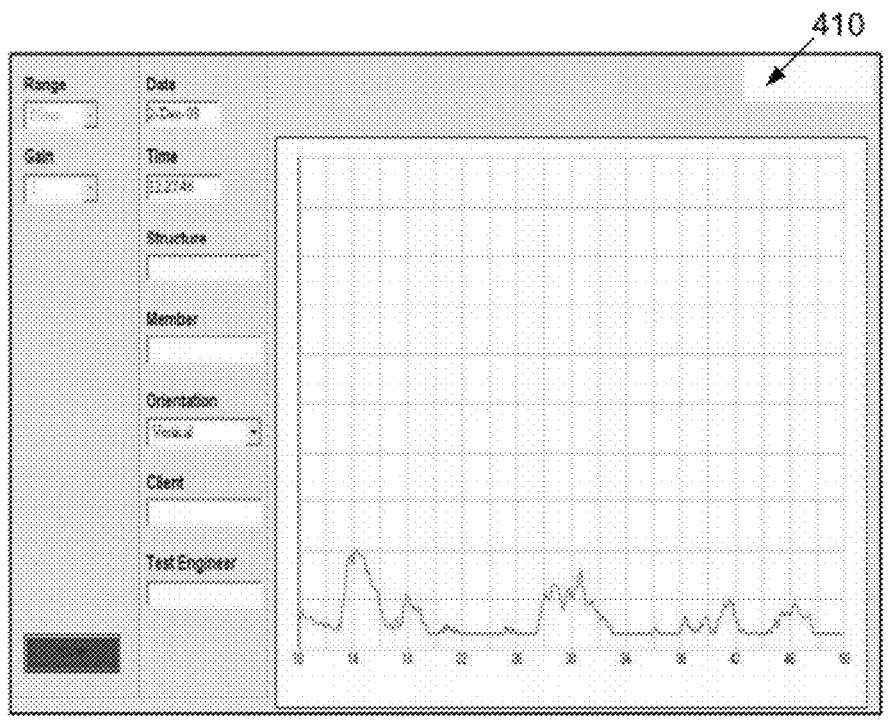
FIG. 7B shows a display of the disclosed sensor detecting a chemical agent in a flooded member.

FIG. 7B shows a time of flight measurement 410 for glycol (MEG). The speed of sound through glycol is about 1660 m/s. The sensor system 300's response indicates a narrower internal diameter of the flooded member due to the increase speed of sound through the glycol. Yet, the actual diameter of the flooded member is known, and the difference between this response of the sensor system 300 compared to the baseline calibration of the member flooded with seawater can then be used to determine that the flooded member contains glycol at this measurement.

Figure 7C:
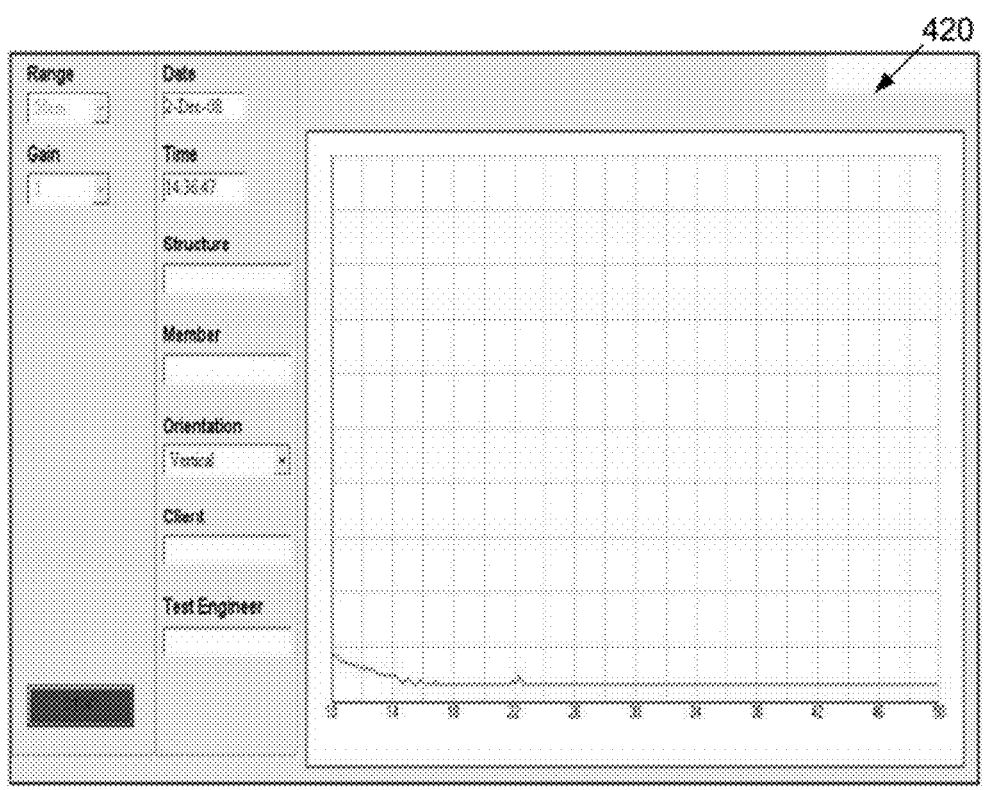
FIG. 7C shows a display of the disclosed sensor detecting gas in a flooded member.

FIG. 7C shows a time of flight measurement 420 for nitrogen. The ultrasonic pulse from the sensor unit 310 does not transmit through gas so that no pulse is reflected. If nitrogen gas is present in the flooded member at the suction side of the pump 118, the sensor system 300 determines the presence of the gas by the lack of reflected pulse. Based on this detection, the pumping system 110 can stop pumping to prevent damage to the pump 118 by gas in the suction side of the pump 118.

As can be seen, the time of flight measurements obtained with the sensor system 300 can be calibrated to detect several different types of fluid that may be used in treating, conditioning, and dewatering a pipeline. The differences between seawater, potable water, and glycol are particularly useful for dewatering operations with glycol swabbing chemicals. Yet, the sensor system 300 can be adapted to other types of operations.

The conditioning agent can include any chemical agent used to condition residual water from a pipeline. Examples of conditioning agents currently in use in the industry include concentrated ionic solutions such as Super Dry 2000 available from Weatherford; glycols such as mono-ethylene glycol (MEG), di-ethylene glycol (DEG), and tri-ethylene glycol (TEG); and alcohols including ethanol, methanol and the propanols. Other chemicals such as methylene chloride can also be used. Of the aforementioned chemical treating agents, MEG and methanol are most commonly used as chemical drying or hydrate suppression agents. Also included as chemical agents are the highly viscous gelled liquids referred to in the industry as gel pigs.

Teachings related to the present disclosure can be found in the following: U.S. patent application Ser. No. 12/468,158 (205-0091US), filed May 19, 2009 and entitled "Apparatus and Methods for Subsea Control System Testing;" U.S. patent application Ser. No. 12/526,885 (205-0052US), filed Aug. 12, 2009 and entitled "Subsea Pipeline Service Skid;" U.S. Pat. No. 7,281,880 (205-0036US) entitled "Subsea Vehicle Assisted Pipeline Commissioning Method;" U.S. Pat. No. 7,708,839 (205-0037US) entitled "Pig Launcher;" and U.S. Pat. No. 6,539,778 (205-0034US) entitled "Commissioning"—each of which is incorporated herein by reference in its entirety.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A subsea pipeline conditioning system for handling a discharged fluid from a pig receiver at a terminus of a subsea pipeline during conditioning with a chemical agent, the system comprising:
   a system inlet of the system in fluid communication with the pig receiver at the terminus;
   a system outlet of the system in fluid communication with the system inlet;
   at least one subsea bladder in fluid communication with the system inlet and selectively receiving the discharged fluid; and
   at least one sensor in fluid communication with the system inlet and at least detecting a presence of the chemical agent in the discharged fluid,
   wherein the at least one subsea bladder receives the discharged fluid from the pig receiver in response to the detected presence of the chemical agent in the discharged fluid, and
   wherein the system outlet discharges the discharge fluid to a subsea environment in response to an absence of the detected presence of the chemical agent in the discharged fluid.

2. The system of claim 1, wherein the system comprises a subsea pump pumping the discharged fluid from the system inlet, wherein the at least one sensor comprises a gas sensor detecting a presence of gas in the discharged fluid, and wherein the subsea pump stops the pumping of the discharged fluid in response to the detected presence of gas.

3. The system of claim 1, wherein the system comprises a subsea pump pumping the discharged fluid from the system inlet, and wherein the subsea pump diverts the discharged fluid from the subsea environment to the at least one subsea bladder in response to the detected presence of the chemical agent.

4. The system of claim 1, wherein the system outlet discharges the discharged fluid to the subsea environment as long as the discharged fluid detected by the at least one sensor is indicative of water.

5. The system of claim 1, further comprising a connector selectively diverting the discharged fluid to the at least one subsea bladder.

6. The system of claim 1, further comprising a subsea pump having a pump inlet in communication with the discharged fluid of the system inlet and pumping the discharged fluid from the pump inlet to a pump outlet.

7. The system of claim 6, further comprising a subsea vehicle powering the subsea pump.

8. The system of claim 7, wherein the subsea vehicle carries the subsea pump thereon.

9. The system of claim 6, wherein the pump outlet of the subsea pump selectively connects to the subsea environment or to the at least one subsea bladder.

10. The system of claim 6, wherein the at least one sensor comprises a gas sensor detecting a presence of gas in the discharged fluid, and wherein the subsea pump stops pumping the discharged fluid from the pump inlet to the pump outlet in response to the detected presence of gas.

11. The system of claim 6, wherein the subsea pump pumps the discharged fluid from the pump inlet to the pump outlet in response to the detected presence of the chemical agent as long as the pump outlet is in communication with the at least one subsea bladder.

12. The system of claim 1, wherein the at least one sensor comprises an ultrasonic transducer disposed on a fluid member in communication with the discharged fluid, the ultrasonic transducer transmitting an ultrasonic signal into the fluid member and detecting any reflection of the transmitted signal.

13. The system of claim 12, wherein the fluid member comprises a pressure vessel in communication with the discharged fluid.

14. The system of claim 13, wherein the fluid member comprises a flow passage in communication with the discharged fluid.

15. The system of claim 1, wherein the at least one subsea bladder comprises a collapsible bladder filling with the discharged fluid diverted thereto.

16. The system of claim 1, further comprising a sample container selectively connecting in fluid communication with the discharged fluid diverted to the at least one subsea bladder and obtaining a fluid sample therefrom.

17. The system of claim 1, wherein the at least one sensor is selected from the group consisting of: a flooded member detector, a hydrometer, a densitometer, a liquid density transducer, a spectroscope, a spectrometer, a water cut meter, a leak detector, and a capacitance or conductivity detector.

18. The system of claim 1, wherein the at least one sensor detects at least one property of the discharged fluid being an indication of one of water, the chemical agent, and gas; and wherein the system is further configured to:
   at least permit the discharge of the discharged fluid to the subsea environment in response to the indication of water absent the chemical agent;
   pump the discharged fluid to the at least one subsea bladder in response to the indication of the chemical agent; and
   stop pumping of the discharged fluid in response to the indication of gas.

19. A subsea pipeline dewatering method, the pipeline having a first terminus in fluid communication with a second terminus, the second terminus having a pig receiver, the method comprising:
   deploying at least one slug of a chemical agent from the first terminus of the pipeline;
   receiving fluid at a system inlet in fluid communication with the pig receiver;
   discharging the received fluid in advance of the at least one slug to a subsea environment;
   monitoring for a property indicative of the chemical agent in the received fluid being discharged to the subsea environment; and
   switching discharge of the received fluid from the subsea environment to at least one subsea bladder in response to detection of the monitored property.

20. The method of claim 19, wherein deploying the at least one slug comprises containing the at least one slug between at least two pigs.

21. The method of claim 20, wherein deploying the at least one slug comprises conveying the at least one slug along the pipeline using gas injected at the first terminus.

22. The method of claim 19, wherein monitoring for the property indicative of the chemical agent in the received fluid further comprises monitoring for a presence of gas in the received fluid.

23. The method of claim 22, further comprising stopping pumping of the fluid with a subsea pump in response to detection of the presence of gas.

24. The method of claim 19, wherein discharging the received fluid in advance of the at least one slug to the subsea environment comprises discharging the received fluid to the subsea environment as long as the monitored property of the fluid is indicative of water.

25. The method of claim 19, wherein discharging the received fluid in advance of the at least one slug to the subsea environment comprises pumping the received fluid to the subsea environment with a pump in fluid communication with the system inlet.

26. The method of claim 19, wherein switching discharge of the received fluid from the subsea environment to the at least one subsea bladder in response to detection of the monitored property comprises selectively discharging the chemical agent to the at least one subsea bladder.

27. The method of claim 26, wherein selectively discharging the chemical agent to the at least one subsea bladder comprises connecting fluid communication of the system inlet from the subsea environment to the at least one subsea bladder.

28. The method of claim 19, wherein switching discharge of the received fluid from the subsea environment to the at least one subsea bladder comprises pumping the chemical agent with a pump in fluid communication between the system inlet and the at least one subsea bladder.

29. The method of claim 19, wherein switching discharge of the received fluid from the subsea environment to the at least one subsea bladder comprises selectively sampling the chemical agent.

30. The method of claim 19, wherein monitoring for the property indicative of the chemical agent in the received fluid further comprises detecting for an indication of one of water, the chemical agent, and gas in the received fluid; and wherein the method further comprises:

at least permitting the discharge of the received fluid to the subsea environment in response to the indication of water absent the chemical agent;

pumping the received fluid to the at least one subsea bladder in response to the indication of the chemical agent; and stopping pumping of the received fluid in response to the indication of gas.

* * * * *